Patented May 20, 1941

2,242,320

UNITED STATES PATENT OFFICE 2,242,320

CHALK RESISTANT TITANIUM DIOXIDE PIGMENT

George Francis New, Eaglescliffe, England, assignor to Titan Company, Inc., Wilmington, Del., a corporation of Delaware No Drawing. Application December 27, 1938, Serial No. 247,843

9 Claims. (Cl. 134—39)

The present invention relates to titanium dioxide pigments and has for an object, among others, reducing the tendency of such pigments to chalk when formulated in the usual protective coatings.

Titanium dioxide pigments are highly regarded for their outstanding opacity, whiteness and brightness and because of their chemical inertness. However, their application in exterior finishes of all types, linseed oil, synthetic resin, nitrocellulose, etc., has been limited because of the relatively severe chalking, and fading in the case of tinted coatings, to which such finishes are subject.

The present invention is based upon the discovery that when titanium dioxide pigments are associated with chromium naphthenate in surface coating compositions, the chalking and fading normally found with the titanium dioxide pigments are materially reduced. The association of the titanium dioxide pigment with the chromium naphthanate may be attained by coating the titanium dioxide pigment with chromium naphthenate prior to incorporating the pigment in film-forming vehicles, or by mixing chromium naphthenate into a surface coating composition containing titanium dioxide pigments.

It has been observed that treating, for example, coating, titanium dioxide pigments with watersoluble salts of chromium, reduces the tendency of such pigments to produce a fading of organic dyestuffs when such pigments are used to deluster artificial silk. It has been further noted that chromium oleate, mixed with a paint composition containing titanium dioxide pigments produces some reduction in chalking. However, the tendency of titanium dioxide pigments to accelerate the fading of organic dyestuffs is not related to the tendency of titanium pigments to chalk when incorporated in surface compositions, nor is the treatment with water-soluble chromium salts equivalent to the association, as taught by the present invention, of titanium dioxide pigments with chromium naphthenate, because the treatment with water - soluble chromium salts may have little effect, if any, on the tendency to chalk, and furthermore, tends to reduce the affinity, i. e., the wettability, of the treated pigment for oleaginous film-forming vehicles. Furthermore, the addition of chromium oleate to paint compositions involves the hazard that the oleic acid radical, which is not desirable in surface-coating compositions, will have a deleterious effect upon the composition, whereas the naphthenate acid radical does not possess any undesirable properties. In fact, certain of the metal naphthenates, e. g., those of lead, manganese and cobalt, are among the best siccative agents for oleaginous surface coating compositions known to date.

When it is desired to coat the titanium dioxide pigment with the chromium naphthenate—this is the preferred procedure—this may be accomplished by suspending the titanium dioxide pigment particles in an aqueous solution of a water-soluble naphthenate, such as alkali metal naphthenate, for instance, sodium naphthenate. To this suspension of titanium dioxide pigment particles in the naphthenate solution an aqueous solution of a water-soluble chromium salt, such as a chromium halide, e. g., chromium chloride, chromium sulfate, chromium nitrate, etc., is added. Thus, by double decomposition there will be deposited on the titanium dioxide pigment particles a coating of chromium naphthenate. It is, of course, obvious, and within the scope of this invention, to employ the reverse technique, i. e., to suspend the titanium dioxide pigment particles in a solution of water-soluble chromium salts, and to add thereto the solution of soluble naphthenate. Stirring, in order to keep suspended the titanium dioxide pigment particles is an expedient which may be employed, because it tends to insure completeness of the reaction and a thorough coating of each individual pigment particle. Increasing temperature may hasten the process somewhat, but the temperature factor is not critical.

Titanium dioxide pigments may also be coated with chromium naphthenate according to the present invention by suspending the titanium pigment particles in a solution of chromium naphthenate dissolved in an organic liquid solvent for the said naphthenate. Such solvents as are commonly used in the thinning or diluting of paints are useful here and include mineral spirits, solvent naphtha, turpentine, and the like. The solvents may then be removed from the pigment by evaporation. When employing this method of coating the titanium dioxide pigments it may, of course, be advantageous to select a lower boiling solvent than the usual paint thinners.

The improved results of the present invention may also be attained by incorporating a desired amount of chromium naphthenate directly into a finished surface coating composition, for example, a paint, enamel and the like, containing titanium dioxide pigments. No variation in the method of making such surface coating compositions nor in the formulation thereof is required when adding chromium naphthenate according to the present invention. Chromium naphthenate enters into uniform and complete admixture, in all probability in solution, with the drying oils and thinner of the surface coating composition and prior and during the drying apparently becomes associated with the titanium dioxide pigments in such a way as to coat them, thus retarding the chalking of these pigments. Obviously, the chromium naphthenate may be incorporated into the paint, or other type coating composition, at any stage of its formulation. For example, it may be added with the pigment when grinding the latter into the vehicle, it may be dissolved or suspended in the thinner used for thinning the pigmented paste, etc.

The quantity of chromium naphthenate which is effective need be only a few tenths of one percent, in the neighborhood of about two-tenths percent, based on the weight of the titanium dioxide pigment either treated directly or contained in a surface coating composition. Amounts over 5 percent are not necessary, inasmuch as it has been found that there results little or no further improvement when using larger amounts. The following examples are given purely for illustrative purposes.

Example 1

To prepare 500 kilograms of titanium dioxide containing 1 percent chromium naphthenate the titanium dioxide was suspended in water as a 20 percent slurry. 13.5 liters of technical sodium naphthenate, which had been found to give 5 kilograms of chromium naphthenate when treated with an excess of chromium sulfate solution, were dissolved in the water and 181 cc. of a chromium sulfate solution containing 27.6 kilograms chromium per liter were added while stirring. The stirring was continued for one hour at room temperature. (The slurry was not heated to avoid hydrolysis of the chromium sulfate.) The slurry was subsequently filtered, washed free of soluble salts, dried and pulverized.

The resultant product showed marked chalking resistance when incorporated in the usual film-forming vehicles and exposed, as a surface coating, to weathering conditions.

Example 2

One hundred kilograms of titanium dioxide, substantially pure TiO₂, was suspended in an aqueous solution of chromium chloride by vigorous agitation. To the resulting suspension a sufficient amount of a solution of sodium naphthenate was added to precipitate upon the titanium dioxide pigment particles, about 1 percent chromium naphthenate. The treated pigment was separated in the manner described under Example 1 and the resulting product had properties similar to the properties obtained from Example 1.

Example 3

One kilogram of previously prepared chromium naphthenate was dissolved in 300 kilograms of a light petroleum distillate. To this solution was added 100 kilograms of titanium dioxide pigment and the petroleum distillate recovered by evaporation. The resulting treated titanium dioxide pigment exhibited chalk resistant properties of the same improved order as the products obtained from Examples 1 and 2.

Example 4

A paint was prepared of the following composition:

| | Parts |
|---|---|
| Titanium dioxide pigment | 100 |
| Raw linseed oil | 45 |
| Medium stand oil | 10 |
| Thinner | 16 |
| Drier | 4 |

To this paint composition was added with careful mixing one part of chromium naphthenate dissolved in a little paint thinner. (It is obvious that the chromium naphthenate could have been dissolved in the thinner during the formulation of the paint.) Films of this paint showed chalk resistance comparable to similar paints prepared from the pigments treated according to Examples 1, 2, and 3.

The improved results of the present invention are illustrated by a series of tests made to compare the behavior of titanium dioxide pigment treated with chromium naphthenate with the same untreated pigment. Painted panels containing these pigments were exposed in Florida facing south at an angle of 45° from the vertical. In one such test chalking was noticed after 46 days' exposure of a paint film containing untreated titanium dioxide. On the other hand, a film of a paint of similar composition containing a chromium naphthenate treated titanium dioxide pigment only began to chalk after about 98 days' exposure.

While the foregoing examples have been directed to the treatment of titanium dioxide pigment, it is obvious that chromium naphthenate will have the same beneficial effect when used with the so-called composite titanium pigments, e. g., titanium-barium pigment, etc.

The foregoing description has been given for clearness of understanding and no undue limitations should be deduced therefrom, but the appended claims should be interpreted as broadly as possible in view of the prior art.

I claim:

1. A chalk resistant, oleaginous surface coating composition containing a titanium dioxide pigment and between about 0.2 percent and about 5.0 percent chromium naphthenate, based upon the weight of the said pigment.

2. A chalk resistant, oleaginous surface coating composition containing a composite titanium pigment and between about 0.2 percent and about 5.0 percent chromium naphthenate, based upon the weight of the said pigment.

3. A chalk resistant, oleaginous surface coating composition containing a titanium dioxide pigment coated with from about 0.2 percent to about 5.0 percent chromium naphthenate, based upon the weight of the said pigment.

4. A titanium dioxide pigment coated with from about 0.2 percent to about 5.0 percent chromium naphthenate.

5. A composite titanium pigment coated with from about 0.2 percent to about 5.0 percent chromium naphthenate.

6. A method for producing a chalk resistant titanium dioxide pigment which comprises coating particles of titanium dioxide pigment with chromium naphthenate in an amount between about 0.2 percent and about 5.0 percent based on the weight of the treated pigment.

7. A method for producing a chalk resistant titanium dioxide pigment which comprises coating particles of composite titanium pigment with chromium naphthenate in an amount between about 0.2 percent and about 5.0 percent based on the weight of the treated pigment.

8. A method for producing a chalk resistant titanium dioxide pigment which comprises precipitating upon the particles of a titanium dioxide pigment suspended in aqueous media by a double decomposition reaction taking place within said media between a water-soluble naphthenate and a water-soluble chromium salt, the amounts of the reactants being such as to precipitate an amount of chromium naphthenate between about 0.2 percent and about 5.0 percent based on the weight of said pigment.

9. A method for producing a chalk resistant titanium dioxide pigment which comprises suspending the particles of a titanium dioxide pigment in a solution of chromium naphthenate in an organic liquid solvent therefor and removing the solvent by evaporation.

GEORGE FRANCIS NEW.